United States Patent
Voight et al.

(10) Patent No.: US 10,000,825 B2
(45) Date of Patent: Jun. 19, 2018

(54) PROCESS, METHOD AND PLANT FOR RECOVERING SCANDIUM

(71) Applicant: Clean TeQ Pty Ltd, Notting Hill, Victoria (AU)

(72) Inventors: Peter Voight, Notting Hill (AU); Nikolai Zontov, Notting Hill (AU); John Carr, Notting Hill (AU)

(73) Assignee: Clean TeQ Pty Ltd, Notting Hill, Victoria (AU)

(*) Notice: Subject to any disclaimer, the term of this patent is extended or adjusted under 35 U.S.C. 154(b) by 204 days.

(21) Appl. No.: 14/651,145

(22) PCT Filed: Dec. 10, 2013

(86) PCT No.: PCT/AU2013/001439
§ 371 (c)(1),
(2) Date: Jun. 10, 2015

(87) PCT Pub. No.: WO2014/089614
PCT Pub. Date: Jun. 19, 2014

(65) Prior Publication Data
US 2015/0307966 A1    Oct. 29, 2015

Related U.S. Application Data

(60) Provisional application No. 61/760,751, filed on Feb. 5, 2013.

(30) Foreign Application Priority Data

Dec. 11, 2012 (AU) ................. 2012905399

(51) Int. Cl.
*C22B 59/00* (2006.01)
*C22B 3/42* (2006.01)
(Continued)

(52) U.S. Cl.
CPC ............. *C22B 59/00* (2013.01); *B01J 19/24* (2013.01); *B01J 41/07* (2017.01); *B01J 43/00* (2013.01);
(Continued)

(58) Field of Classification Search
None
See application file for complete search history.

(56) References Cited

U.S. PATENT DOCUMENTS 4,968,504 A * 11/1990 Rourke ............... C01F 17/0006
210/682
5,019,362 A 5/1991 Rourke et al.

FOREIGN PATENT DOCUMENTS

CN    101824555    9/2010
CN    102899485    1/2013
(Continued)

OTHER PUBLICATIONS

International Search Report for PCT/AU2013/001439 dated Feb. 18, 201454.

*Primary Examiner* — Melissa S Swain
(74) *Attorney, Agent, or Firm* — Womble Bond Dickinson (US) LLP

(57) ABSTRACT

The present invention relates to a process, method and plant for recovering scandium and ions containing scandium using an ion exchange resin from a feed stream. The feed stream may be, but is by no means limited to, a leach liquor or leach pulp.

16 Claims, 4 Drawing Sheets

(continued)

(51) Int. Cl.
  *C01F 17/00* (2006.01)
  *B01J 19/24* (2006.01)
  *B01J 43/00* (2006.01)
  *B01J 41/07* (2017.01)
  *B01J 49/07* (2017.01)
  *B01J 49/45* (2017.01)
  *B01J 49/57* (2017.01)

(52) U.S. Cl.
  CPC ............... *B01J 49/07* (2017.01); *B01J 49/45* (2017.01); *B01J 49/57* (2017.01); *C01F 17/0006* (2013.01); *C22B 3/42* (2013.01); *B01J 2219/00002* (2013.01); *B01J 2219/24* (2013.01); *Y02P 10/234* (2015.11)

(56) References Cited

FOREIGN PATENT DOCUMENTS

| | | |
|---|---|---|
| RU | 2062810 | 6/1996 |
| RU | 2196184 | 1/2003 |

* cited by examiner

PROCESS, METHOD AND PLANT FOR RECOVERING SCANDIUM

FIELD OF THE INVENTION

The present invention relates to a process, method and plant for recovering scandium and ions containing scandium using an ion exchange resin from a feed stream. The feed stream may be, but is by no means limited to, a leach liquor or leach pulp.

BACKGROUND OF THE INVENTION

Scandium, although quite abundant, is relatively under-utilised in industry as there are no convenient (high grade) sources of the metals. Important low level sources of scandium include uranium tailings and the waste sludge of titanium, zirconium and red mud. The sludge from such plants consist largely of mixed iron, manganese, titanium, tungsten and other hydrous oxides with varying levels of scandium, typically in the range of 10 to 100 ppm.

Processes which attempt to recover scandium from these materials face the problem of the waste stream being extremely complex and heterogeneous chemically. About two dozen other elements are present in greater or lesser amounts. Furthermore, the low level of scandium present, mandates processing large quantities of the sludge. Patented procedures for the separation of scandium from iron and other metals have disadvantages which make them ill-suited to the large scale production of scandium. For instance, an extraction-based procedure (U.S. Pat. No. 5,019,362) involves adjusting the pH of an acidic solution to a terminal value of 3.0 to 3.5. The solution is filtered. The acidic solution is mixed with a chelating resin in the hydrogen form, in an ion exchange column and again adjusting the pH to a terminal value between 1.9 and 2.1. The resin is rinsed with a mineral acid and the scandium is removed from the resin by passing diglycolic acid through the column. However, during the pH adjustment, metal hydroxides precipitate (especially if titanium is present in solution) causing scandium to precipitate as well. Up to 40-50% scandium can be lost during this step.

Another method (see RU patent 2,062,810) is carried out by sorption of scandium from hydrochloric solution with the help of N-(2-oxipropyl)-N'-(20oxi-3-pyridinium propyl)-N''-methylene phosphonium polyethylene polyamine followed by washing and desorption. The washing takes place with water, and desorption is carried out using a carbonate or fluoride solution. While this method achieves separation of scandium from iron and other metals, the selectivity of the amphoteric resin for scandium in the presence of titanium is not high, resulting in very poor scandium purification.

Another method for processing scandium-bearing waste from the production of aluminium, titanium, zirconium, tin, tungsten, uranium (see RU patents 1,572036; 2,196184) includes: sorption from sulphuric acid solution on an anion exchange resin (preconditioned with sulphuric acid solution); sorption of scandium by phosphorus-containing resin; desorption of scandium and processing of eluate. Sorption is carried out on weak base anion exchange resin treated with solution of sulphuric acid with concentration of 150-500 g/L. The weak base anionic resin has polyamine functionality. While this method increased the degree of scandium purification from titanium, the scandium concentration in the pregnant solution after desorption was low, as full scandium requires 4 to 5 bed volume of desorption solution per volume pregnant resin.

It is to be understood that the references to the prior art publications in this specification does by no means constitute an admission that the publications form part of the common general knowledge in the art, in Australia or any other country.

SUMMARY

The present invention relates to a process for recovering scandium from a feed stream using an ion exchange resin, the process including:
 a) contacting the feed stream with an ion exchange resin to sorb scandium or ions containing scandium from the feed stream onto the ion exchange resin under acidic conditions to form a loaded resin;
 b) treating the loaded resin with a neutralising solution that deprotonates the loaded resin, wherein the neutralising solution after deprotonating the loaded resin is lean in scandium or ions containing scandium; and
 c) treating the loaded resin with a stripping solution to desorb scandium or ions containing scandium from the resin and form a product stream rich in scandium or ions containing scandium and a barren resin.

Throughout this specification, the term "scandium" embraces scandium ions, complex ions containing scandium, and even compounds containing scandium.

Throughout this specification, the phrase "deprotonating the loaded resin" or variations thereof, embraces treating the loaded resin with a neutralising solution prior to stripping scandium from the resin and may result in, but us by no means limited to,
 i) the neutralising solution reacting with any residual acid entrained with the resin;
 ii) the neutralising solution reacting with ions, including complex ions sorbed onto the resin by removing excess protons; and
 iii) the neutralising solution reacting with the resin, for example, ion exchange sites onto which targeted material such scandium has not been sorbed during step a).

Without being limited by theory, it is possible that treating the loaded resin according to step b) may change the affinity of the resin for scandium, for example, reduce the affinity of the resin for scandium without causing scandium to become desorbed from the resin. It is also possible that the treating the loaded resin according to step b) may not have any impact on the affinity of the resin for scandium.

It is within the scope of the present invention that steps b) and c) may be carried out in a single stage or vessel in which at least part of the neutralising solution forms part of the product stream. Ideally however, the neutralising solution that contacts the resin is at least partly separated from the resin prior to stripping scandium from the loaded resin with the stripping solution according to step c).

For example, the neutralising solution is drained from the loaded resin prior to treating the loaded resin with the stripping solution according to step c). It will be appreciated some neutralising solution may ultimately be included in the product stream, for example, as a result of pooling of the neutralising solution in the resin or wetting of the resin by the neutralising solution.

Ideally, scandium remains sorbed onto the resin during step b) compared to step c) in which the loaded resin is stripped of scandium.

Step b) may include treating the loaded resin with the neutralising solution so that the neutralising solution in contact with the loaded resin has a terminal pH from 6 to 10, and suitably ranging from 7 to 9, and even more suitably from 7.5 to 8.5. The loaded resin may be rinsed, washed, flooded or submerged in a pool of the neutralising solution whereby the terminal pH of the neutralising solution is in the ranges mentioned above.

Step b) may include treating the loaded resin with the neutralising solution that includes either one or a combination of: i) washing water, or ii) a reagent.

The reagent may include any suitable reagent that can deprotonate the loaded resin such as, but by no means limited to, sodium carbonate, sodium hydroxide, calcium hydroxide or a combination thereof.

The ion exchange resin for sorbing scandium or compounds containing scandium according to step a) may be an amphoteric resin, and suitably a resin having amino functional groups, and even more suitably an amino-phosphorus resin.

The amino-phosphorus resin may comprise, but not limited to, an amino phosphonic group, an amino-phosphinic group, an amino phosphoric functional group and/or a combination thereof.

One advantage of the present invention is that product stream has a higher concentration of scandium and the ultimate yield of scandium can be higher than previously obtained from processes that do not include deprotonating the loaded resin with a neutralising solution prior to stripping the resin in accordance with the present invention.

Another advantage of the present invention is that scandium recovery is possible from any feed stream including acidic solutions or pulps such as uranium tailings, red mud, and waste sludge containing zirconium, titanium, or compounds including zirconium or titanium. Feed streams of this type are often acidic as a result of upstream processes, however, if this is not the case, the process may include acidifying the feed stream to facilitate sorption of scandium or compounds containing scandium according to step a).

In the situation in which feed stream includes titanium or compounds containing titanium, suitably, the process may include a preliminary step of recovering titanium or titanium containing compounds from the feed stream prior to recovering scandium. This preliminary step may include recovering titanium using any suitable means including heating the feed stream to precipitate titanium. The preliminary step may also include recovering titanium or compounds containing titanium using another ion exchange resin that is different to the ion exchange resin on which the scandium is sorbed according to step a). Suitably, the other ion exchange resin is an anionic resin including weak base anionic resins and may include a polyamine functional group.

The titanium may be desorbed from the weak anion resin by 200-250 g/L hydrochloric acid solution.

The feed stream may be a leached stream such as leach liquor or leach pulp and may be generated by in-situ leaching, vat leaching, heap leaching and/or agitated leaching at ambient, elevated temperature and/or elevated pressure conditions.

The process may include forming the feed stream by acid leaching material including ores, concentrates and so forth. The acid leaching may be carried using any acid, which may, for example, be in the form of sulphuric acid, nitric acid, hydrochloric acid, and/or a combination thereof.

The feed stream may contain liquid and solid phases, of which the liquid phase includes scandium or scandium containing compounds that are sorbed onto the ion exchange resin.

The pH of the feed stream contacted with the ion exchange resin in accordance with step a) may be any value less than 7.0, and suitably has a value ranging from 0.0 to 5.0.

The step of contacting the feed stream with the ion exchange resin may be carried for a period up to 40 or 30 hours and suitably from 3 to 30 hours. In other words, the residence period over which scandium or scandium containing compounds is sorbed onto the ion exchange resin may be from 3 to 30 hours.

The step of contacting the feed stream with the ion exchange resin may be carried out in a bed of the ion exchange resin. The feed stream may flow upwardly or downwardly through the bed. In the situation in which the bed moves, the feed stream may flow in counter current flow to the direction of movement of the resin.

The feed stream may flow through up to 10 beds of the resin.

Feed stream may be pre-filtered prior contacting the ion exchange resin according to step a).

The stripping solution in step c) may be any suitable reagent including any one or a combination of water, a carbonate salt, a bicarbonate salt, a sulphate salt, a sulphuric acid, a nitrate salt, a nitric acid, fluoride salt, hydrofluoric acid, or a combination of these.

The carbonate salt used as a stripping agent in step c) may be sodium carbonate that is generated by contacting sodium hydroxide with carbon dioxide. Suitably, the stripping solution contains from 100 to 250 g/L of sodium carbonate.

The process may include adding a precipitating agent to the product stream that complexes with scandium to reduce the solubility thereof.

The precipitating agent may include a salt hydroxide, such as a sodium hydroxide, which is added to the product stream to precipitate a scandium hydroxide product.

The process may also include acid leaching the scandium hydroxide product to form a concentrated solution thereof. The process may also include adding a second precipitating agent including ammonium oxalate, oxalic acid and/or sodium hydroxide which is added to the product stream to precipitate a scandium oxalate product.

The process may also include calcinating the scandium precipitant.

The barren resin formed in step c) may be washed with water.

The barren resin formed in step c) may be regenerated with an anion. For example, the resin may regenerated to a sulphate, chloride, nitrate by contacting the barren resin with a solution of sulphuric acid, sulphate salt, hydrochloric acid, sodium chloride, nitric acid or a combination of these.

The present invention also relates to a method for recovering scandium from a feed stream using an ion exchange resin, the method including:
  a) sorbing scandium or ions containing scandium from the feed stream onto the ion exchange resin under acidic conditions to form a loaded resin;
  b) deprotonating the loaded resin by contacting the loaded resin with a neutralising solution, wherein the neutralising solution after deprotonating the loaded resin is lean in scandium; and
  c) desorbing scandium or ions containing scandium from the ion exchange resin under neutral or alkaline conditions to form a product stream rich in scandium or ions containing scandium.

The present invention also relates to a plant for recovering scandium from a feed stream using an ion exchange resin, the plant including:

a contacting stage in which the feed stream is contacted with the ion exchange resin to sorb scandium or ions containing scandium from the feed stream onto the ion exchange resin under acid conditions to form a loaded resin;

a first treating stage in which the loaded resin is treated with a neutralising solution that deprotonates the loaded resin, wherein the neutralising solution after deprotonating the loaded resin is lean in scandium or ions containing scandium; and a second treating stage in which the loaded resin is treated with a stripping solution to desorb scandium or ions containing scandium from the resin and form a product stream rich in scandium or ions containing scandium and a barren resin.

The method and plant of the present invention may also include any one or a combination of the other features described herein such as features of the process.

The invention also provides a process, resin and plant substantially as herein described.

The invention also provides a process, resin and plant substantially as herein described with reference to the Figure.

The invention also provides a scandium product recovered using a process, method and plant of the present invention.

DETAILED DESCRIPTION

Figure 1:
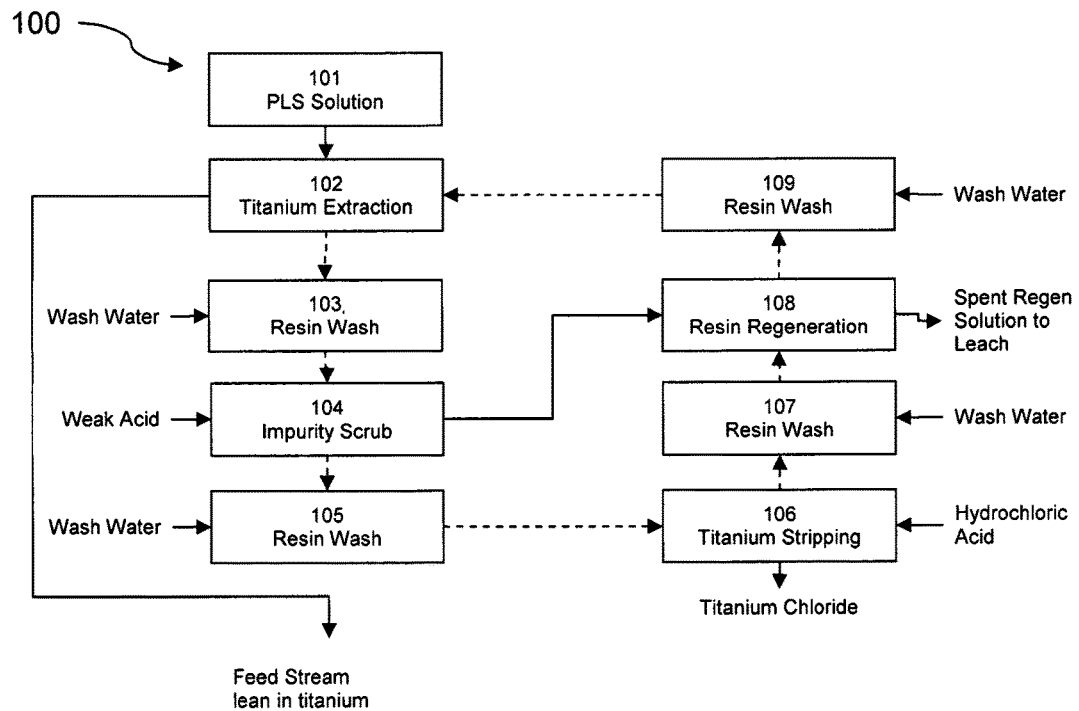
FIG. 1 is a block diagram illustrating the steps of a process for extracting and recovering scandium from a feed stream.
Figure 1:
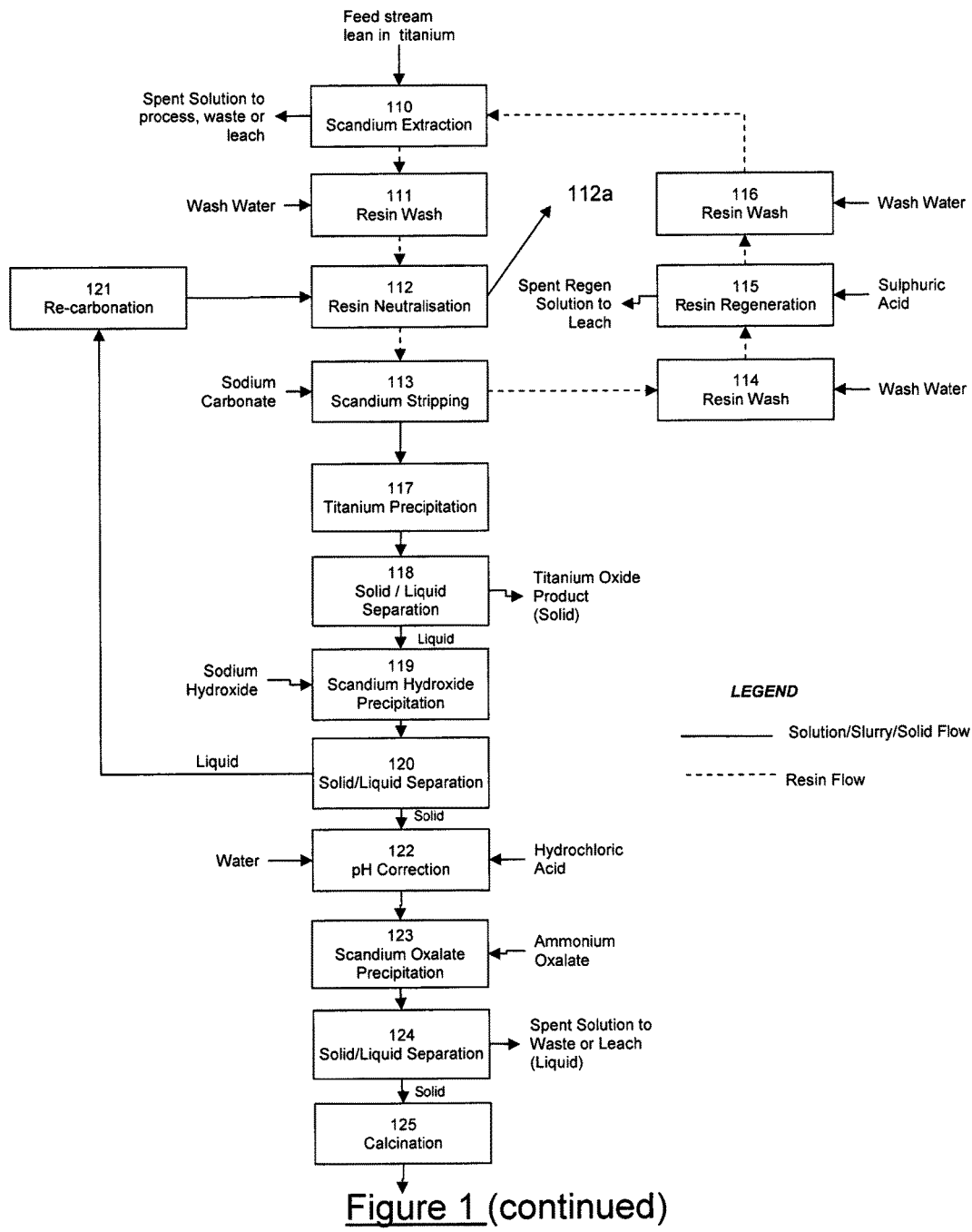

Various embodiments of a process and plant for recovering scandium from a feed stream will now be described in more detail. The feed stream may be any stream such as acidic leach solution or pulp. An ion exchange resin is used to recover scandium from the feed stream and form the product stream rich in scandium. An advantage of the process and plant is that an eluate product stream richer in scandium can be produced compared to other methods.

The present invention offers a number of advantages, one of which is a safety benefit over alternative process technologies, such as solvent extraction which can have higher inherent fire risks, and higher capital costs during initial installation.

Scandium Recovery

The resin used for adsorbing scandium is preferably an amino-phosphorous resin. Suitable resins include those having a functional group comprising an amino phosphorous group. Examples of these include, but are not limited to an amino-phosphonic group, an amino-phosphinic group, an amino phosphoric functional group, and/or a combination thereof. Like amino-phosphorous resins, other amphoteric resins, cationic resins or anionic resins may be used.

The pregnant feed stream may originate from any acid leach process such as in-situ leach, heap leach or agitated leach process but not limited to these.

In one embodiment the feed stream includes a leach lixiviant including any one or a combination of sulphuric acid, hydrochloric acid, or nitric acid. Ideally, the feed stream has a pH in the range of 0.0 to 5.0.

While performance can vary, scandium extraction systems are typically designed to recover greater than 95% of soluble scandium.

The feed stream may be contacted in a series of vessels, each containing a volume of resin. Collectively the vessels may be referred to as the contacting stage. The number of vessels will be dependent on the process conditions for each application, but is most likely to be between 3-10 vessels in each series. The agitation of slurry and resin in each vessel can be with mechanical forces (impellers or pumps) or with compressed air. The movement of resin between stages can either be continuous, using resin transport mechanisms between each vessel such as airlifts or mechanical pumps or fixed resin volumes can be in each vessel as in carousel operations.

Interstage screening of feed stream, such as a leach solution or leach pulp, can be carried out between vessels with static screens, vibrating screens, rotating submerged pumping screens, but not limited to these. Pulp can be transported by mechanical pumping, impeller pumping or gravity for plants in cascade arrangements. Resin volumes in each vessel will be dependent on process conditions for each application but is most likely to be between 1-50% v/v per contactor.

The feed stream may flow up or down in the vessels of the contacting stage or in counter currently to the flow of resin.

The contacting stage may include equipment such as, but is not limited to, continuous, carousel or batch Resin-In-Pulp (RIP) or Resin-In-Leach (RIL) systems. In this stage, the resin adsorbs scandium or ions containing scandium to form a scandium loaded resin. The contacting stage may also include pre-screening of the feed stream to remove solids including pulp or slurry prior to entering into the resin-contacting equipment.

In continuous and pulp systems, scandium-loaded resin (loaded resin) is transported to a dedicated column, whereby it can undergo the stripping procedure. The transportation of resin can either be with airlifts or mechanical pumps or eductors. For pulp systems, the loaded resin is typically screened to remove entrained solids from the resin, prior to stripping and may comprise of a range of screens, including static screens, vibrating screens or trommel screens.

Typically the first step in the stripping stage requires the scandium-loaded resin to be washed using water to elutriate any fine particulates remaining on the resin. This is typically done in an elutriation or fluidised wash column, whereby the resin bed is partly expanded through water injection in the bottom of the column at a sufficient superficial velocity to separate resin and solid particles. In fixed or carousel columns, back-washing of the resin bed at high velocities are used. The requirement of this washing step is dependent on the level of solids in the feed solution and the technology selected for extraction and stripping.

We have found that the yield and concentration of scandium in the product stream is improved by deprotonating the scandium-loaded resin using a neutralising/deprotonating solution that includes either one, or a combination of, washing water and/or an alkaline solution, such as sodium carbonate, sodium hydroxide, calcium hydroxide, or any combination of these. The neutralising solution contacts the scandium-loaded resin and suitably the neutralising solution has a terminal pH of 7.5 to 8.5. This deprotonatisation or neutralisation step may be carried in the first treating stage such as an agitated contactor as impurities may precipitate in solution. It is preferred, however, that the neutralising solution of the first treating stage, e.g., spent neutralising solution is lean in scandium. The spent neutralising solution may be sent to leaching or other areas of the process and is preferably very lean in scandium. The neutralising solution used for deprotonatisation may be generated in downstream process steps, such as scandium oxide precipitation.

Deprotonated scandium-loaded resin may then be contacted with a stripping solution to strip any scandium loaded onto the resin into solution in a second treating stage. The stripping reagents may include carbonate, bicarbonate, sulphate and/or nitrate. These reagents may strip the scandium from the resin as scandium carbonate, scandium sulphate or scandium nitrate complexes. The scandium rich product solution is sent to precipitation. Ideally, after the loaded resin is treated with the neutralizing solution, the load resin is stripped by the stripping solution without any intermediate steps between the neutralizing step and the stripping step.

The second treating stage may be in the form of, but is not limited to, batch or fixed bed, carousel, moving packed bed (i.e. Higgins Loop®, Clean-iX® cLX), fluidised bed (e.g. NIMCIX) style contacting equipment and others. The equipment may include some form of clarification or filtration before extraction.

In the cases where the contacting stage and the second treatment stages are continuous systems (e.g. moving packed bed and fluidised column), the resin may be transported by airlifts, mechanical pumps, or eductors but not limited to these.

Resin volume and residence time in contacting stage or the second treatment stage will be dependent on the process condition for each application. In one embodiment the residence time is between 3 and 30 hours. However, the residence time will be dependent on the resin volume.

Regenerating Barren Resin that has been Stripped of Scandium

Barren resin that is stripped of scandium is sent to a resin washing stage where it is washed with water to recover any entrained strip solution. Wash water containing small amounts of stripping solution may be returned to the stripping solution make-up stage.

The washed, barren resin may be regenerated before being returned to contacting stage. A regeneration solution such as dilute sulphuric acid may be used to convert the resin back to its sulphate form. Sulphuric acid may be mixed with return water from the regeneration wash stage to produce a dilute (for example ranging from 5-10% w/w) sulphuric acid regeneration solution. Spent regeneration solution may be sent to leaching to recover any excess acid in solution. After regeneration, the resin may be washed to remove excess regeneration solution, with resulting weak regeneration solution being recycled to regeneration solution make up.

The washed, regenerated scandium resin may then be returned to the contacting stage for adsorbing scandium or ions containing scandium. Depending on the design of the system, buffer columns for loaded and barren resin may be required. Resin transportation to extraction can use airlifts, mechanical pumps, eductors, compressed air or other methods.

Optional Preliminary Steps Such as Impurities Recovery

Ideally, the feed stream fed to the contacting stage is relatively lean in titanium or titanium containing ions. Depending on upstream process conditions, the feed stream may include a level of titanium or titanium containing ions that needs to be reduced or removed prior to contacting with the scandium resin.

In one example, the process may include extracting an impurity, such as titanium, vanadium, uranium, iron or ions containing titanium, vanadium, uranium or iron, and using an ion exchange resin in a preliminary extraction step. The resin has an affinity for the impurity, and is suitably a weak based anion resin, and may for example, have a polyamine functional group.

The weak base anion resin (impurity resin) may be contacted with the feed stream prior to scandium recovery and when in the form of an acidic pregnant leach solution or leach pulp, the feed stream may first be clarified. The impurities extraction stage is only required if impurities, such as titanium are present in high concentrations and are required to be recovered or removed prior to scandium extraction.

While performance can vary, impurities extraction systems are typically designed to recover greater than 60% of soluble impurities, such as titanium.

Pregnant feed stream may be contacted with a fixed bed of titanium resin in an up-flow or down flow arrangement or counter currently to the flow of resin, in continuous systems.

The extraction equipment in which titanium resin is contacted with impurities-contained solution or pulp and stripping solution includes, but is not limited to batch or fixed bed, carousel, moving packed bed (i.e. Higgins Loop®, Clean-iX® cLX), fluidised bed (e.g. NIMCIX) style contacting equipment and others. The equipment may include some form of clarification or filtration before extraction.

The extraction equipment in which an impurities resin is contacted with impurities-contained slurry or pulp may be, but is not limited to, continuous, carousel or batch Resin-In-Pulp (RIP) or Resin-In-Leach (RIL) systems. The system may include pre-screening of pulp or slurry prior to entering into the resin-contacting equipment.

Once the titanium resin has been contacted with pregnant feed stream to extract the desired amount of titanium (if required), it is stripped and regenerated in an impurities stripping stage.

For batch and carousel systems, columns are contacted with a series of different reagents and wash waters through a series of valves and pumps directed to a specific column in a set sequence.

In continuous and pulp systems, impurities-loaded resin (loaded resin) is transported to a dedicated column, in which it can undergo the stripping step. The transportation of the impurities resin can either be with airlifts or mechanical pumps or eductors. For pulp systems, the loaded resin is typically screened to remove entrained solids from the resin, prior to stripping and may comprise of a range of screens, including static screens, vibrating screens or trommel screens.

Typically the first step in the stripping stage requires the resin to be washed using water to elutriate any fine particulates remaining on the impurities resin. This is typically done in an elutriation or fluidised wash column, whereby the resin bed is partly expanded through water injection in the bottom of the column at a sufficient superficial velocity to separate resin and solid particles. In fixed or carousel columns, back-washing of the resin bed at high velocities are used. The requirement of this washing step is dependent on the level of solids in the feed solution and the technology selected for extraction and stripping.

When the feed stream contains impurities, it may also be possible to selectively desorb some impurities by first scrubbing the loaded resin with an acid scrubbing solution prior to stripping the resin of titanium.

A variety of impurities may have co-loaded onto the resin and can affect the purity of the final product. These can be scrubbed by contacting the loaded resin with a solution of a weak acid such as, weak sulphuric acid or sulphurous acid in the case of removing iron. The scrub step is optional depending on the amount of impurities present. The spent scrub solution is normally sent to leach, as it can contain acid and a small amount of metals. The spent scrub solution may also be sent to the impurities resin regeneration step.

Washed, scrubbed impurities-loaded resin may be contacted with a stripping solution to strip any impurities loaded onto the resin into solution. In one example, the stripping reagents may include hydrochloric acid which may strip titanium from the impurities resin as titanium chloride. The titanium rich product solution is sent to downstream recovery. The titanium-stripped (barren) resin is sent to resin washing. Barren resin may then be washed with water to recover any entrained strip solution. Wash water containing small amounts of acid may be returned to the stripping solution make-up stage.

The washed, barren impurities resin may be regenerated before being returned to extraction. A regeneration solution such as dilute sulphuric acid may be used to convert the resin back to a sulphate form. Sulphuric acid may be mixed with return water from the regeneration wash stage to produce a dilute (~5-10% w/w) sulphuric acid regeneration solution. Spent regeneration solution may be sent to leaching to recover any excess acid in solution. After regeneration, the resin may be washed to remove excess regeneration solution, with resulting weak regeneration solution being recycled to form part of a regeneration solution make up stream.

The washed, regenerated impurities resin may then be returned to the extraction stage. Depending on the design of the system, buffer columns for loaded and barren resin may be required. Resin transportation to extraction can use airlifts, mechanical pumps, eductors, compressed air or other methods.

For batch and carousel systems, columns are contacted with a series of different reagents and wash waters through a series of valves and pumps directed to a specific column in a set sequence.

Prior to contacting the scandium resin with the feed stream, the process may also include an optional pre-filtration step to reduce the concentration of solids in the feed stream with a view to preventing blockage of the scandium resin and/or the impurities resin. The pre-filtration step may be used depending on the amount of suspended solids and/or slimes in the feed stream. In this way the pre-filtration step may be used to ensure low suspended solids so as to not affect the performance of the process. The pre-filtration step may be carried out using sand filtration, clarification, thickening, but are not limited to these.

Refining of the Scandium Product

The scandium-rich product stream may be subjected to a precipitation step to precipitate a scandium hydroxide production. Prior to scandium oxide precipitation, titanium may be precipitated (if present) by heating the solution to 70 degrees to form titanium hydroxide. The resulting supernatant may then subjected to a scandium hydroxide precipitation. When using sodium carbonate or sodium bicarbonate for the stripping reagent, the product stream, containing scandium carbonate may be precipitated with sodium hydroxide.

The resulting scandium hydroxide precipitate may be filtered and washed with potable water. The scandium hydroxide filtrate may be carbonated to allow sodium carbonate to be generated for either resin neutralisation i.e., deprotonatisation or scandium stripping in the ion exchange section. Carbon dioxide may be contacted with sodium hydroxide filtrate to convert all excess sodium hydroxide into sodium carbonate. The contacting equipment can be through a scrubber or tank. Scandium hydroxide precipitate may be repulped in water and dissolved in an acid solution such as sulphuric acid, nitric acid or hydrochloric acid. The scandium dissolved may be precipitated with ammonium oxalate or oxalic acid to form a scandium oxalate product. Sodium hydroxide is used to maintain pH at the optimum precipitation conditions. Final scandium oxalate product may thickened, washed and calcined to produce a final scandium oxide product.

Conditions may be controlled to ensure the barren solution contains less than 5 ppm scandium. In cases where clarified solutions are used; barren solutions may be recycled back to leaching, comminution or in the existing process. In cases were leached pulps are used; barren pulps may be neutralised and sent to tailings. Here a portion of the solution may be recycled back into the process.

Preferred Embodiment

A preferred embodiment of the present invention will now be described in with reference to FIG. 1.

Process 100 shown in FIG. 1 provides for the extraction and recovery of scandium from feed streams 101, such as acidic solutions pulps using an amino-phosphorus resin, deprotonating the loaded resin prior to stripping using an alkaline reagent such as sodium carbonate, sodium hydroxide or calcium hydroxide, and stripping the loaded resin in a separate step using a reagent such as carbonate, bicarbonate or nitrate.

The process may also include a preliminary step of extracting titanium from solution. Step 102 includes contacting the feed stream 101 with a weak base resin with polyamine functionality to selectively extract titanium from solution. The feed stream 101 typically has a leach lixiviant in the form of sulphuric acid. In process 100 conditions are controlled to ensure the barren solution contains less than 1 g/L titanium before it is sent to scandium extraction (step 110).

Prior to stripping and scrubbing, the resin loaded with titanium is washed in step 103 to remove any solid particulates on the resin from the extraction stage.

As shown in FIG. 1, the process 100 also includes step 104 of a scrubbing impurities. In the embodiment shown weak acid is used. The scrubbing step serves to scrub minor impurities such as iron, which may also co-load onto the resin and can be scrubbed by contacting the loaded resin with a solution of weak sulphuric acid or a reducing acid such as sulphurous acid in the case of removing iron. Dilute sulphuric acid will remove minimal titanium from the resin. As noted above, the scrub step is optional depending on the amount of impurities present. The spent scrub solution is normally sent to resin regeneration, to use the acid to convert the resin into its appropriate form prior to titanium extraction.

In step 105 the resin is washed to remove impurities. Wash water can be used for scrub solution make-up.

In step 106, titanium is stripped from the resin using hydrochloric acid to produce a titanium chloride product.

In step 107, the barren resin is washed to remove any excess acid from the resin from step 106. This water can be used for stripping solution make-up.

In step 108 the resin is suitably regenerated into a sulphate form by contacting with dilute sulphuric acid. In this embodiment, the spent solution from step 104 is used. The spent solution from this step can be sent to leach or a different part of the process to recover the acid.

In step 109, the regenerated resin is washed to remove any excess acid from the resin from step 108. This water can be used for impurity scrub solution make-up.

In step 110 the feed stream suitably in the form of an acidic pregnant leach solution and lean in titanium is contacted with an amino-phosphorous resin to selectively extract titanium from solution. In process 100 conditions are controlled to ensure the barren solution contains less than 1 ppm scandium before it is sent to waste, neutralised or returned to the process.

Prior to deprotonating the scandium-loaded resin and stripping, the resin is washed in step 111 to remove any solid particulates on the resin from the extraction stage.

In step 112 the resin is deprotonated using an alkaline solution in which the alkaline solution has a terminal pH of 7.5 to 8.5. In this embodiment, the alkaline solution used for deprotonating is a recycled solution from step 120 which is re-carbonation, generating sodium carbonate. The re-carbonation step is optional and the sodium hydroxide solution may be used directly in step 112. The spent alkaline solution 112a used to deprotonate the scandium loaded resin is separated from the resin and either returned to feed, recycled to the plant or sent to waste.

In step 113 the scandium is stripped from the resin with a stripping solution, such as sodium carbonate containing solution, to remove scandium from the resin as scandium carbonate.

In step 114, the barren resin is washed to remove any excess acid from the resin from step 113. This water can be used for stripping solution make-up.

In step 115 the resin is regenerated into the sulphate form by contacting it with dilute sulphuric acid. The spent solution from this step can be sent to leach or a different part of the process to recover the acid.

In step 116, the regenerated resin is washed to remove any excess acid from the resin from step 115. This water can be used for regeneration solution make-up.

In step 117, titanium (if presented) is precipitated as titanium hydroxide by heating the scandium-rich eluate from step 113 to 70 degrees.

This titanium hydroxide solid is separated from the liquid phase in step 118 in a sold/liquid separation step, typically consisting of a thickener or filter.

In step 119, scandium is precipitated as scandium hydroxide through the addition of sodium hydroxide to a terminal pH of 12.5.

This scandium hydroxide solid is separated from the liquid phase in step 120 in a sold/liquid separation step, typically consisting of a thickener or filter. The liquid phase is recycled to resin neutralisation in step 112. This solution can be re-carbonated by contacting it with carbon dioxide, converting remaining sodium hydroxide into sodium carbonate.

In step 122 the solid scandium oxide is repulped and undergoes pH correction with an acid, such as hydrochloric acid, sulphuric acid or nitric acid to a terminal pH of 3 to 4. Titanium and other impurities remain as solid and can be separated out. Although not illustrated in FIG. 1, the process may include an additional solid/liquid separation step at this point to remove undissolved impurities.

In step 123 scandium is precipitated as scandium oxalate by adding either ammonium oxalate or oxalic acid.

In step 124, the scandium oxalate is separated from the liquid phase in step 123 in a sold/liquid separation step, typically consisting of a thickener or filter.

In step 125 the solid scandium oxalate is calcined at 700 degrees to generate a high purity scandium oxide final product.

Trials

Trials were conducted to demonstrate the improvement that can be obtained between:
  i) processes in which loaded resin is not neutralisation prior to desorption of the targeted species, namely scandium, and
  ii) an embodiment of the present invention in which loaded resin is neutralised, at least to some extent, prior to the desorption of the targeted species from the resin.

First Trial

The first trial used a waste stream having the composition as set out in Table 1 below. The waste stream was contacted with an aminophosphorus resin to sorb scandium and ions containing scandium.

TABLE 1

| Component in waste stream (leachate) | Concentration (mg/L) |
| --- | --- |
| Sc | 15 |
| Fe | 32,000 |
| $Al_2O_3$ | 1,800 |
| $TiO_2$ | 4,100 |
| $V_2O_5$ | 710 |
| $Cr_2O_3$ | 400 |
| MnO | 3,500 |
| $H_2SO_4$ | 260,000 |

A series of tests having different ratios of waste stream (the leachate) to resin were performed. In each test, the leachate was contacted with the resin for a period of 24 hours and the temperature was maintained constant. After the contacting step, loaded resin was separated, washed with water and the targeted species, scandium, desorbed from the resin using a 150 g/L sodium carbonate desorption solution. The first trial was characterised by not having an intermediate step in which loaded resin is neutralised prior to desorption of scandium. The results of the first trial can therefore serve as "a control" against which the present invention can be compared.

Figure 2:
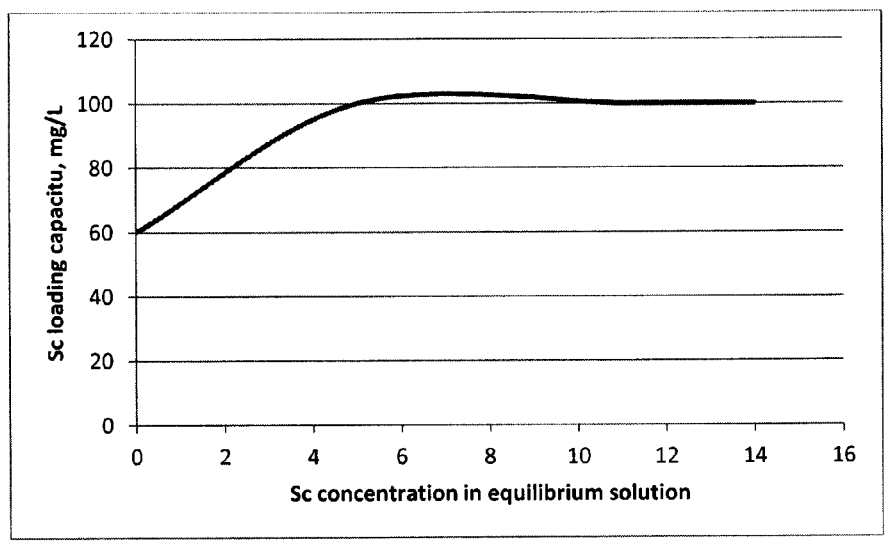
FIG. 2 is a graph illustrating a sorption isotherm of scandium loading capacity of the resin in mg/L for different scandium concentrations in mg/L.

Product streams rich in scandium were obtained for each ratio of the leachate to resin and analysed. FIG. 2 is a sorption isotherm that provides details on the loading capacity of the resin under different scandium concentrations. The first trial showed that the process had a very good isotherm that can recover 100% of the scandium from the leachate. That is, the scandium concentration in the feed stream after sorption, reduced from 15 mg/L to 0 mg/L.

Loading capacity of aminophosphorus resin for scandium was 100-125 mg/L for all ranges concentrations of scandium.

Second Trial

A second trial included a preliminary step of removing titanium from the waste stream (the leachate) shown in Table 1 prior to sorption of scandium from the feed stream.

The waste stream was contacted in a mixer for 24 hours with a weak base anion exchange resin. The anion exchange resin may be any suitable resin for sorbing titanium.

The titanium concentration in the feed stream after contacting with the anion resin was 0.94 g/L of TiO2 and the scandium concentration was 12 mg/L. Although some titanium remained in solution, the pre-treated stream was then used as the feed stream in the third and fourth Trials described below.

The feed stream, lean in titanium, and having a scandium concentration of 12 mg/L was then the subject of the further test for recovering scandium in accordance with the procedure of the first Trial.

Figure 3:
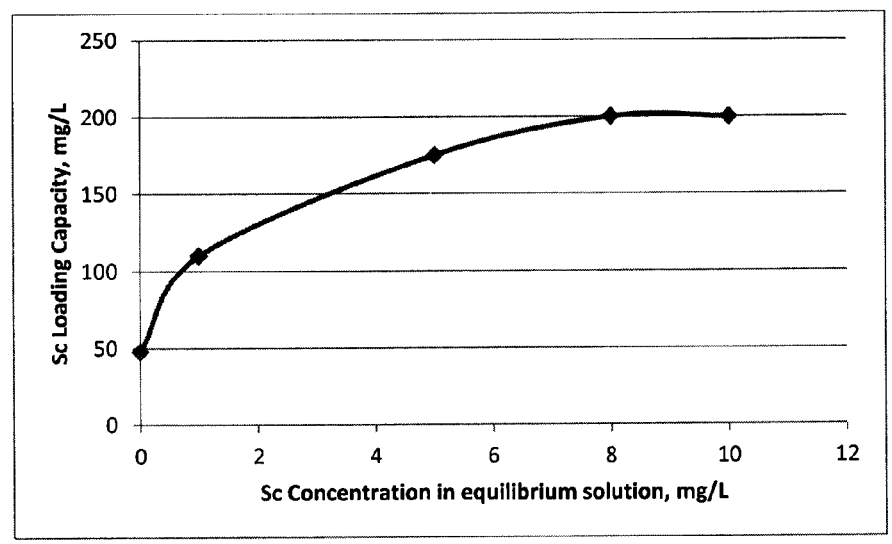
FIG. 3 is a graph illustrating the scandium loading capacity of the resin in mg/L, and the scandium concentration in mg/L when titanium has been at least partially removed from the solution prior to sorption.

The product stream of each test was analysed and the results illustrated in FIG. 3. FIG. 3 shows that the partial removal of titanium prior to scandium sorption led to a doubling of the loading capacity of scandium on the aminophosphorus resin.

Third Trial

A third trial was then conducted to determine the volume of desorption solution required to desorb scandium and thereby produce a product stream obtained from the first trial.

This trial was conducted using a 50 mL-glass laboratory burette filled with loaded resin. Loading capacity for scandium is 100 mg/L (see FIG. 2).

Loaded resin was washed with water and desorption solution containing a 150 g/L sodium carbonate was used to strip scandium from the resin.

The desorption solution was added into the top of the burette and collected from the bottom at a rate of 50 mL/hour (i.e., $1.0 V_S/V_R$/hr).

The desorption solution was added to the burette until the scandium concentration of the desorption solution was less than 5 mg/L. Four 25 mL samples of the eluate product stream were collected, and thereafter, three further 50 mL samples were collected. The composition of the samples were analysed and the results and shown in Table 2 below.

TABLE 2

| $\Sigma$ $V_S/V_R$ | Sc, mg/L | Fe, g/L | Al$_2$O$_3$, g/L | TiO$_2$, g/L | V$_2$O$_5$, g/L | MnO, g/L | Cr$_2$O$_3$, g/L | pH |
|---|---|---|---|---|---|---|---|---|
| 0.5 | 0 | 0.49 | 0.03 | 0.34 | 0.08 | 0.03 | 0.00 | 1.5 |
| 1.0 | 18 | 0.00 | 0.01 | 4.8 | 0.2 | 0.00 | 0.00 | N/A |
| 1.5 | 27 | 0.00 | 0.01 | 5.3 | 0.29 | 0.00 | 0.00 | 9.3 |
| 2.5 | 39 | 0.00 | 0.01 | 5.0 | 0.32 | 0.00 | 0.00 | 9.7 |
| 3.5 | 25 | 0.00 | 0.05 | 0.76 | 0.17 | 0.00 | 0.00 | 10.3 |
| 4.5 | 9 | 0.00 | 0.12 | 0.09 | 0.10 | 0.00 | 0.00 | 10.7 |
| 5.5 | 4 | 0.00 | 0.18 | 0.02 | 0.10 | 0.00 | 0.00 | 10.9 |

In Table 2, the ratio $V_S/V_R$ represents the volume of the desorption solution to the fixed volume of resin contained in the burette.

Figure 4:
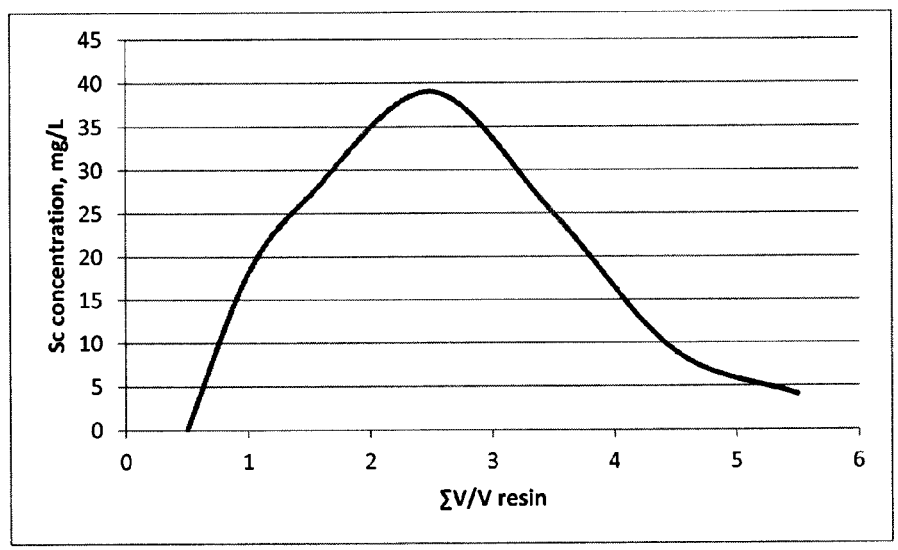
FIG. 4 is a graph illustrating the scandium concentration of the desorption solution in mg/L compared to a ratio of the sum of the volume of the desorption solution to a volume of the resin contacted by the desorption solution.

The trial established that scandium was effectively fully recovered when the ratio of $V_S/V_R$ was in the range of 3-3.5. As shown in FIG. 4, the concentration of scandium in pregnant product stream was 25-39 mg/L.

The composition of the pregnant product stream, detailed in Table 2 above, was free of Fe, Cr and Mn, and only 10 mg/L Al. Vanadium concentration in product stream was 0.3 g/L and usually not report with scandium during additional purification. Titanium concentration in product stream was 5 g/L. It is believe that the titanium would need to the precipitated before precipitation or purification of scandium from the product stream.

Fourth Trial

The purpose of the fourth trial was to establish that an embodiment of the present invention did in fact provide an improvement.

In particular, the fourth trial included contacting the aminophosphorus resin with a feed stream lean in titanium. It will be appreciated that depending on the source of the feed, the feed stream may be lean in titanium without carrying out a preliminary titanium recovery step, such as that described above in relation in the second trial. In the present instance, the feed stream was pre-treated as described above under the heading second trial.

However, prior to treating the loaded resin with the stripping solution, the loaded resin was first washed with water and then treated with a neutralising solution containing 150 g/L Na$_2$CO$_3$. The treatment was carried out until the neutralising solution in contact with the loaded resin had a terminal pH of 7.5.

The neutralising solution in contact with the loaded resin was analysed and confirmed to have a scandium content of 0 mg/L.

Following the neutralisation step, the fourth trial then involved stripping the loaded neutralised resin with stripping stream containing 150 g/L sodium carbonate solution.

The stripping solution was added into the top of the column containing the loaded neutralised resin and a product stream rich in scandium was collected at the bottom at the rate of 150 mL/hour (0.5 $V_S/V_R$/hr).

The stripping solution was conveyed through the bed of the resin in the column until the scandium concentration of the stripping solution was less than 5 mg/L.

A compositional analysis of the final product stream is as follows.

TABLE 3

| $\Sigma$ $V_S/V_R$ | $\Sigma$Product stream, mL | pH | Sc, Ppm | Na, g/L | CO$_3$, g/L | Loading Capacity for Sc in Sample, mg/L Resin |
|---|---|---|---|---|---|---|
| 0.5 | 125 | 8.9 | 0 | 7.9 | 11 | 0 |
| 1.0 | 250 | 9.2 | 9 | 22 | 27 | 4.5 |
| 1.5 | 375 | 9.4 | 39 | 41 | 55 | 19.75 |
| 2.0 | 500 | 9.7 | 64 | 52 | 69 | 32 |
| 2.5 | 625 | 10.1 | 37 | 58 | 79 | 18.5 |
| 3.0 | 750 | 10.4 | 19 | 60 | 81 | 9.5 |
| 4.0 | 100 | 10.6 | 11 | 59 | 82 | 11.0 |
| 5.0 | 1250 | 10.8 | 6 | 60 | 83 | 6.0 |
| 6.0 | 1500 | 10.8 | 4 | 61 | 84 | 4.0 |
| | | | | | Total | 105.25 |

Figure 5:
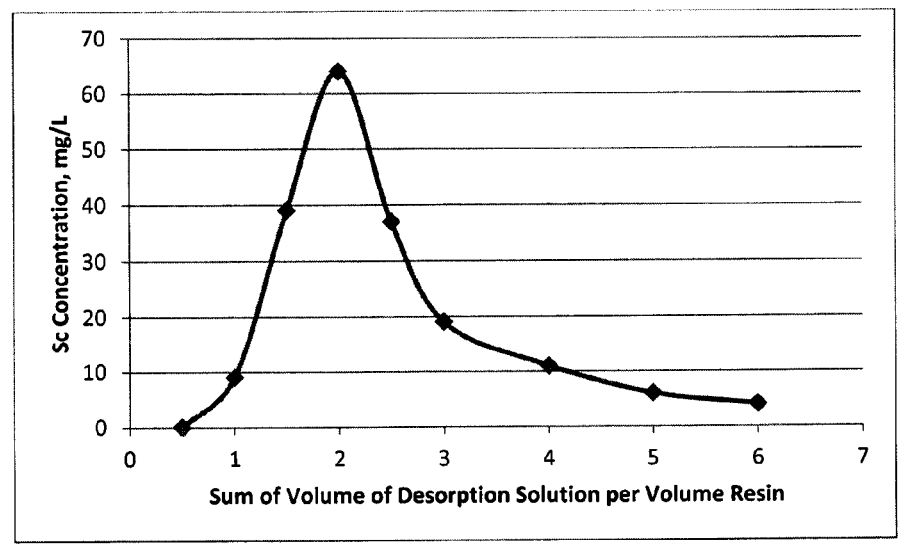
FIG. 5 is a graph illustrating the scandium concentration of the desorption solution in mg/L after neutralisation of the loaded resin compared to a ratio of the sum of the volume of the desorption solution to the volume of the resin contacted by the desorption solution.

The results of the fourth trial in FIG. 5 show that scandium desorption from loaded pregnant resin was better than in both the first and the third trials. Specifically, the neutralisation of the loaded resin prior to treating the loaded with the stripping solution enabled a product stream having a higher scandium content to be produced. Specifically, the product stream in the fourth trial had a scandium content from 40-64 mg/L, compared to the product stream in the third trial having a scandium content from 30 to 40 mg/L. Moreover, the fourth trial established that ratio of the volume of the stripping solution to the volume of the loaded resin was in the range of 1.5-2.0 to 1.0. Therefore, in addition to the product stream having a higher concentration of scandium, the volume of the stripping solution was less for the fourth trial which has the e flow on effect of reducing capital equipment costs by allowing the use of the smaller equipment items.

Except where the context requires otherwise, the term "comprise" and variations of the term, such as "comprising", "comprises" and "comprised", are not intended to exclude further additives, components, integers or steps.

The invention claimed is:

1. A process of recovering scandium from a feed stream using an ion exchange resin, the process including:
   a) contacting the feed stream with an ion exchange resin to sorb scandium or ions containing scandium from the feed stream onto the ion exchange resin under acidic conditions to form a loaded resin, wherein the loaded resin is an amphoteric resin;
   b) treating the loaded resin with a neutralising solution that deprotonates the loaded resin, wherein the neutralising solution after deprotonating the loaded resin is lean in scandium and ions containing scandium, wherein step b) includes treating the loaded resin with the neutralising solution including an alkaline so that the neutralising solution in contact with the loaded resin has a pH from 6 to 10 at the end of step b); and
   c) treating the loaded resin with a stripping solution to desorb scandium or ions containing scandium from the resin and form a product stream rich in scandium or ions containing scandium, and a barren resin.

2. The process according to claim 1, wherein the ion exchange resin that sorbs scandium according to step a) is an amino-phosphorus resin.

3. The process according to claim 1, wherein the feed stream is any one or a combination of: an acidic solution, pulps of uranium tailings, red mud, or waste sludges.

4. The process according to claim 1, wherein the pH of the feed stream contacted with the ion exchange resin in accordance with step a) in the range of 0.0 to 5.0.

5. The process according to claim 1, wherein the neutralising solution that contacts the resin is separated from the resin prior to stripping scandium from the loaded resin with the stripping solution according to step c).

6. The process according to claim 1, wherein step b) includes treating the loaded resin with the neutralising solution so that the neutralising solution in contact with the loaded resin has a pH from 7.5 to 8.5 at the end of step b).

7. The process according to claim 1, wherein the stripping solution includes a reagent including any one or a combination of: a carbonate salt, a bicarbonate salt, a sulphate salt, a sulphuric salt, a nitrate salt, a nitric acid, a fluoride salt, or a hydrofluoric acid.

8. The process according to claim 1, wherein the stripping solution includes sodium carbonate as an active agent.

9. The process according to claim 1, wherein the feed stream has a titanium content of less than 1 g/L.

10. The process according to claim 1, wherein when the feed stream includes titanium or compounds containing titanium, the process includes a preliminary step of recovering titanium or titanium containing compounds from the feed stream prior to recovering scandium according to steps a) to c).

11. The process according to claim 10, wherein recovering titanium or compounds containing titanium includes contacting the feed stream with a weak base anionic exchange resin and desorbing titanium from the resin by using a hydrochloric acid solution.

12. The process according to claim 11, wherein the weak base anionic exchange resin has polyamine functional groups.

13. The process according to claim 1, wherein the process includes adding a precipitating agent to the product stream that complexes with scandium to reduce the solubility thereof.

14. The process according to claim 13 wherein the precipitating agent includes a salt hydroxide, and the process includes acid leaching the scandium hydroxide product to form a concentrated solution thereof.

15. The process according to claim 1, wherein step c) includes washing the barren resin with water and regenerating the resin with an anion and reusing the regenerated resin in step a).

16. A method for recovering scandium from a feed stream using an ion exchange resin, the method including:
   a) sorbing scandium or ions containing scandium from the feed stream onto the ion exchange resin under acidic conditions to form a loaded resin, wherein step a) is carried out at a pH in the range of 0.0 to 5.0 and the resin is an amphoteric resin;
   b) deprotonating the loaded resin by contacting the loaded resin with a neutralising solution, wherein the neutralising solution after deprotonating the loaded resin is lean in scandium, wherein step b) includes treating the loaded resin with the neutralising solution so that the neutralising solution including an alkaline so that the neutralising solution in contact with the loaded resin has a pH from 6 to 10 at the end of step b); and
   c) desorbing scandium or ions containing scandium from the ion exchange resin under neutral or alkaline conditions to form a product stream rich in scandium or ions containing scandium using a stripping solution in which the stripping solution includes any one or a combination of: a carbonate salt, a bicarbonate salt, a sulphate salt, a sulphuric salt, a nitrate salt, a nitric acid, a fluoride salt, a hydrofluoric acid, or a sodium carbonate.

* * * * *